US006788925B2

(12) United States Patent
Domes

(10) Patent No.: US 6,788,925 B2
(45) Date of Patent: *Sep. 7, 2004

(54) RUGGEDIZED TRADESWORKERS RADIO

(75) Inventor: Joseph Domes, Huntington, NY (US)

(73) Assignee: Black & Decker Inc., Newark, DE (US)

( * ) Notice: Subject to any disclaimer, the term of this patent is extended or adjusted under 35 U.S.C. 154(b) by 100 days.

This patent is subject to a terminal disclaimer.

(21) Appl. No.: 10/215,657

(22) Filed: Aug. 10, 2002

(65) Prior Publication Data

US 2003/0069001 A1 Apr. 10, 2003

Related U.S. Application Data

(63) Continuation of application No. 09/963,356, filed on Sep. 25, 2001, now Pat. No. 6,456,837, which is a continuation of application No. 09/209,721, filed on Dec. 11, 1998, now Pat. No. 6,308,059.
(60) Provisional application No. 60/069,372, filed on Dec. 12, 1997.

(51) Int. Cl.[7] .............................................. H01M 10/46
(52) U.S. Cl. ...................... 455/351; 455/348; 455/66.1; 320/138; 320/111; 320/112; 320/114
(58) Field of Search ................................. 455/344, 351, 455/348, 66, 66.1; 320/111, 112, 114, 138; 361/625

(56) References Cited

U.S. PATENT DOCUMENTS

| | | | | |
|---|---|---|---|---|
| 3,458,794 A | * | 7/1969 | Kirchhan | 320/111 |
| 4,712,685 A | * | 12/1987 | Kirchhan | 206/591 |
| 5,222,050 A | * | 6/1993 | Marren et al. | 367/163 |
| 6,308,059 B1 | * | 10/2001 | Domes | 455/351 |

* cited by examiner

*Primary Examiner*—Nay Maung
*Assistant Examiner*—Alan Gantt
(74) *Attorney, Agent, or Firm*—Adan Ayala

(57) ABSTRACT

A tradesworker's radio has a weather and impact resistant features to enable a tradesworker to use the radio under adverse working conditions, such as construction or other work sites. Louvered grills covering moisture resistant loudspeakers are angled downward to protect the speakers from direct splash in case the radio is left outdoors in a heavy downpour. A layer of felt-like material is interspersed between the louvered grills and the loudspeaker cones to offer improved moisture resistance. A non-telescoping antenna of the rubber covered spring type material folds neatly into recess when not in use. The controls include waterproof pushbuttons for on/off, volume adjustment, a weather channel, AM/FM selection and tuning. Elastomeric blocks are bonded to the interior of the housing and the blocks have bonded threaded studs, which are used to shock mount the radio circuit board to the inside of the housing. This circuit board is treated with a conformal coating to improve its moisture resistance. The preferred housing material is a layer of rigid plastic, which is impact resistant and the outer covering is a resilient tough elastomer. The radio can be used with an adapter to convert to a power hand tool battery pack to accommodate a variety of different battery packs and adapters. The battery compartment is generous in size and lined with a soft polyurethane material to protect the battery pack from damage.

12 Claims, 4 Drawing Sheets

RUGGEDIZED TRADESWORKERS RADIO

This application is a continuation of U.S. application Ser. No. 09/963,356, filed Sep. 25, 2001 now U.S. Pat. No. 6,456,837 which appllication is a continuation of application Ser. No. 09/209,721, filed Dec. 11, 1998, now U.S. Pat. No. 6,308,059, which claims benefit, under 35 U.S.C. 119(e) of U.S. Provisional Application No. 60/069,372, filed Dec. 12, 1997.

FIELD OF THE INVENTION

The present invention relates to durable, rugged radios for tradesworker in construction and other worksites.

BACKGROUND OF THE INVENTION

Tradespersons working at construction sites regularly use portable radios for entertainment and to obtain weather reports. However, these radios lack certain features that would be desirable for such use. Small radios often lack the power desirable for overcoming ambient noise of other workers or to carry the sound over long distances outdoors. Although "boom boxes" may have the desired power output, they lack the ruggedness and splash proofing that is desirable. Other features, such as the convenient use of rechargeable batteries, are missing as well.

The prior art relates to some of these shortcomings. U.S. Pat. No. 4,006,764 of Yamamoto et al. relates to a protection case that can be used to enclose a tape recorder or radio to protect it from water spray or dust without seriously impeding sound transmission. U.S. Pat. No. 4,709,201 of Schaefer et al. discloses a modular battery pack with an on/off switch and contacts arranged for various modes of operation. U.S. Pat. No. 4,225,970 of Jaramillo et al. relates to a splash proof portable two-way data terminal/radio. It describes the use of tongue-in-groove elastomeric gaskets in the housing assembly as well as air-permeable water resistant material to achieve its results.

Other prior art include U.S. Pat. No. 5,572,592 of Muckelrath, which describes a field remote control radio transmitter/receiver which includes a weather resistant enclosure. U.S. Pat. No. 5,164,830 of Kim discloses a radio receiver which integrates a weather channel therein. U.S. Pat. No. 5,091,732 of Mileski and U.S. Pat. No. 4,761,813 of Gammel describe field oriented military radio systems. U.S. Pat. No. 4,961,994 of Cariou describes a waterproof coating material.

Shock-mounts for mounting delicate objects are described in U.S. Pat. Nos. 4,395,619 and 4,395,619, both of Harigai and U.S. Pat. No. 4,586,115 of Zimmerman. Retractable electric cords are disclosed in U.S. Pat. No. 3,984,645 of Kresch. Moreover, portable radios are described in general in U.S. Pat. No. 4,913,318 of Forrester.

OBJECTS OF THE INVENTION

It is an object of this invention to provide a radio with improved impact resistance.

It is a further object to provide a radio that has a built-in retractable line cord for operation from an AC supply.

It is yet another object to be able to power the radio with modular batteries normally used in professional portable power tools.

It is a further object to be able to recharge the batteries with a built-in recharger while simultaneously powering the radio from an AC supply.

It is yet another object to provide a splash proof radio.

It is another object to include a switch-selectable weather band tuned to the National Weather Service.

SUMMARY OF THE INVENTION

In keeping with those objects and others which may become apparent, the present invention includes a durable portable radio for tradesworkers with a weather and impact resistant enclosure having an exterior surface and an interior space. The enclosure houses a radio receiver for receiving radio signals and generating electronic audio output signals responsive thereto.

The enclosure of the radio is preferably made of a shock and water resistant solid elastomer, such as acrylonitrile butadiene styene (ABS). The exterior surface of the radio enclosure has a plurality of planar surfaces, wherein a foldable antenna is insertable within a recess extending below one planar surface of the plurality of surfaces.

A handle is formed from a slot extending through a pair of opposite planar surfaces of the radio, and a ventilation opening extends from the interior space of said radio.

The weather and impact resistant enclosure includes one or more downward angled louvered grills covering one or more moisture resistant loudspeakers.

The weather and impact resistant enclosure includes a moisture resistant sound transmitter insulating layer between the louvered grill and the loudspeaker.

A plurality of waterproof push buttons control on/off control, volume adjustment, AM/FM section an optional weather channel and frequency tuning.

To prevent moisture buildup, the weather and impact resistant enclosure includes a hydrophobic air permeable therein.

The radio is powered by either a first power source including an electrical cord engageable with an electrical outlet, or a second power source including an adapter engageable with a secondary direct current power source, such as a tradesworker's hand tool battery pack.

The first power source includes a retractable line cord, which is retractable within a subhousing enclosure within the radio.

The radio receiver is shock mounted to an interior wall of the weather and impact resistant enclosure by a plurality of elastomeric blocks bonded to the interior wall of the weather and impact resistant housing enclosure. The radio receiver itself is preferably coated with a moisture resistant conformed coating, such as acrylic or paralyene.

One or more watertight formed-in-place gaskets seal openings within the weather and impact resistant enclosure.

The alternate DC power source may include a battery pack having a voltage of between about 9.6 to about 18 volts, preferably about 12 volts.

The secondary DC power source may optionally include a combination power supply and battery charger supplied with 115 VAC, which supplies about 13.6 volts through a diode and a switch to the radio receiver. A button causes the power supply to supply voltage through the diode, and the diode feeds current from the power supply to the radio receiver.

Alternately, a plurality of diodes may act as an automatic steering and isolation network to supply either AC supplied current, battery power or simultaneous power and battery charging from AC power.

An optional variable voltage feature permits use of battery packs lower or higher than 12 volts to be used by the radio.

The variable voltage feature includes a socket having a plurality of contacts mating with an adapter, matching predetermined requirements of a DC source battery pack, and a double pole single throw on/off switch controlling a DC/DC power source converter for supplying power to said radio.

As a result, the radio provides a tradesworker with a rugged, durable radio to provide audio entertainment and news under adverse working conditions.

BRIEF DESCRIPTION OF THE DRAWINGS

The present invention can best be described in conjunction with the following drawings, in which.

DETAILED DESCRIPTION OF THE INVENTION

Figure 1:
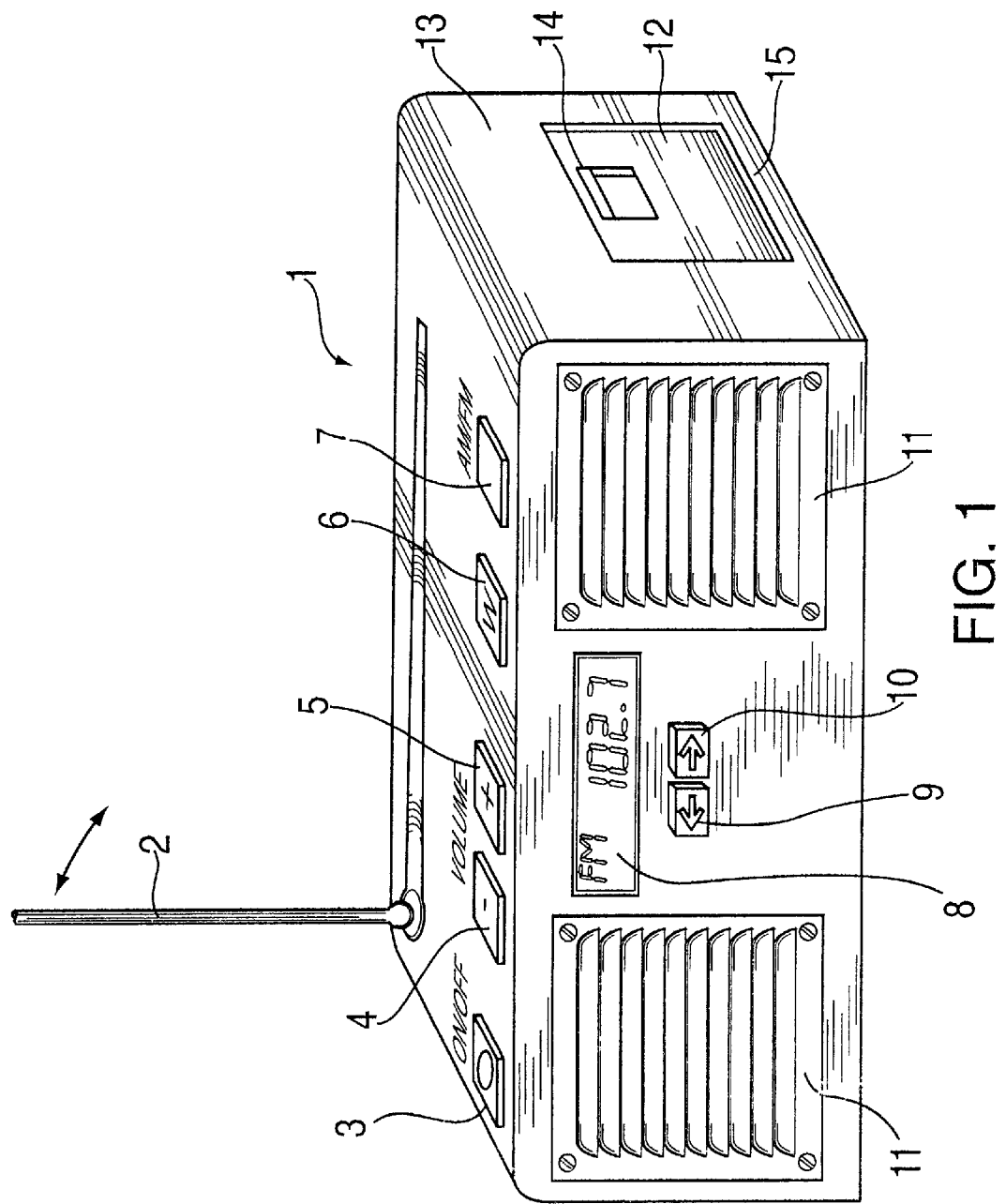
FIG. 1 is a perspective view of the tradesman's radio of the present invention.

FIG. 1 shows the tradesman's radio 1. Housing 13 is a molded plastic structure, although alternate rugged materials such as aircraft aluminum can be used. Stainless steel louvered grills 11 cover the moisture resistant loudspeakers. Louvered grills 11 are angled downward to protect the speakers from direct splash in case radio 1 is left outdoors in a heavy downpour.

A layer of felt-like material such as described in Jaramillo et al. U.S. Pat. No. 4,225,970 can be interspersed between the louvered grills 11 and the loudspeaker cones to offer improved moisture resistance. An example of such material which allows good sound transmission while blocking moisture is known as NB-25, manufactured by Nu-Way Speaker Products, Inc.

Non-telescoping antenna 2 is of the rubber covered spring type material; it folds neatly into recess 3 when not in use. The controls include waterproof pushbuttons for on/off 3, volume adjustment 4 & 5, weather channel 6, AM/FM selection 7 and tuning 9 & 10. The digital tuning display 8 is either a self-illuminating vacuum fluorescent display or an LCD backlighted by an electro-luminescent back light panel. Both of these technologies are common in automotive radio applications. Side door 12 with piano hinge 15 and slide latch 14 provide access to the retractable cord. A similar door (not shown) on the other side provides access to the battery compartment. Both doors are sealed watertight with appropriate gaskets.

Figure 2:
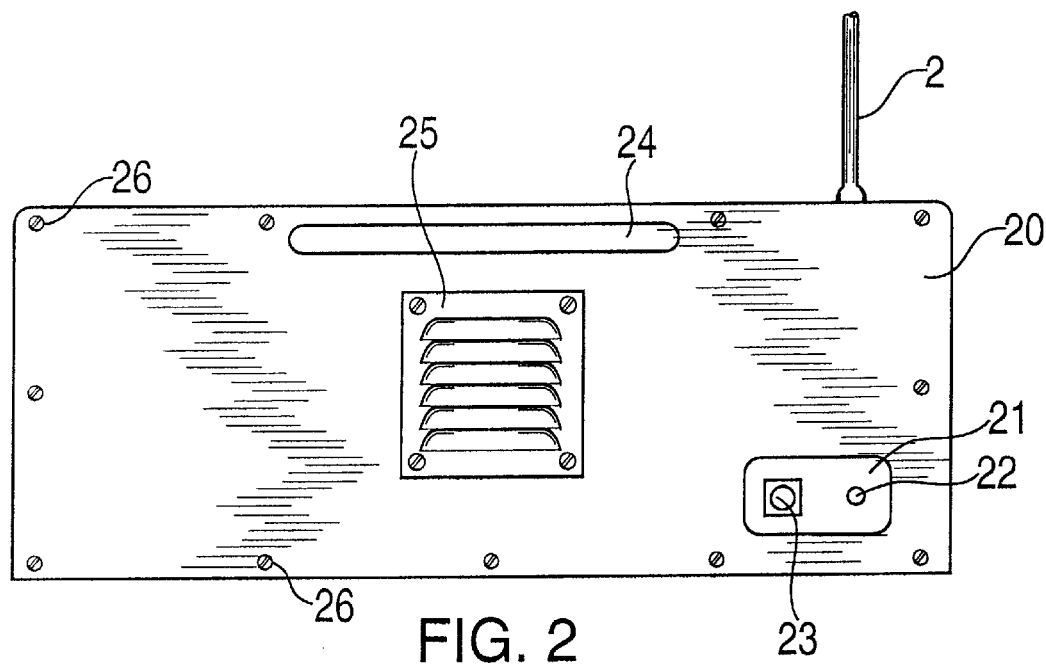
FIG. 2 is a view of the rear panel of the radio as in FIG. 1.

FIG. 2 shows back panel 20 of radio 1. Back panel 20 is screwed to housing 13 with screws 26. Slot 24 is a hand recess for carrying radio 1. Small stainless steel louver 25 is a vent to prevent moisture buildup within radio housing 13. Louver 25 covers an opening in cover 20 that has a layer of hydrophobic air-permeable material such as Tyvek made by the DuPont Company. Other such materials of different composition are often used in medical applications; these may be used here as well.

Waterproof button 23 turns on the battery charger; indicator 22 lights up during charging operations. Both of these are accessible through opening 21.

Figure 3:
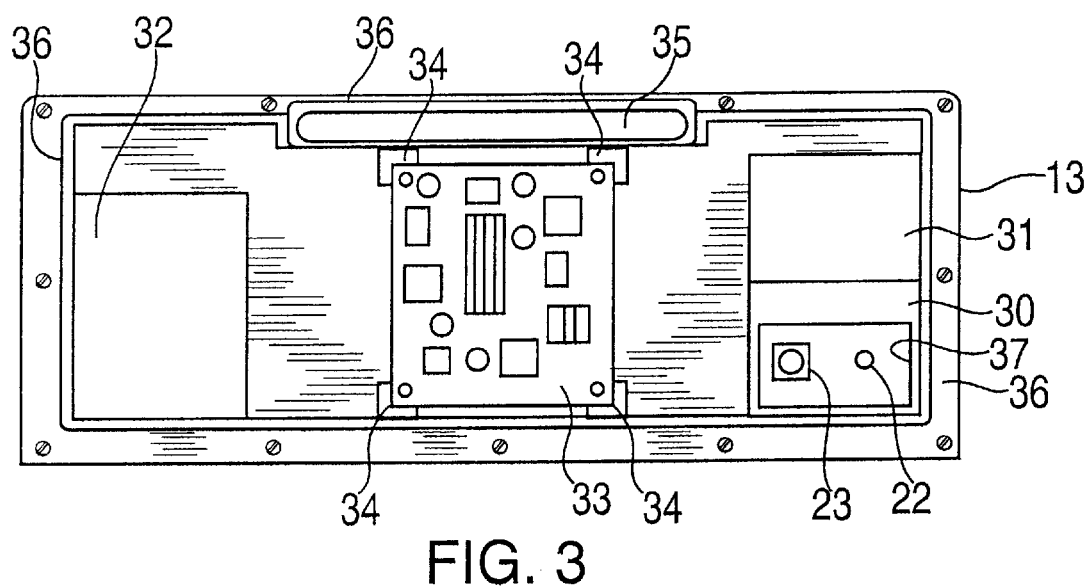
FIG. 3 is a back view of the radio as in FIG. 1 with the rear panel removed.

FIG. 3 shows the interior of housing 13 when back panel 20 is removed. Retractable line cord housing 32 is at the left. Battery compartment 31 is at the right atop charger housing 30. Molded recess 35 communicates with the hand hold slot in back cover 20.

To prevent damage to radio 1, a plurality of elastomeric blocks 34, such as four, are bonded to the interior of housing 13. Blocks 34 have bonded threaded studs which are used to shock mount radio circuit board 33. Circuit board 33 is treated with a conformal coating such as acrylic or paralyene to improve its moisture resistance.

All removable elements that penetrate or mount to housing 13 or back panel 20 are sealed watertight with appropriate gaskets or sealant. "Formed-in-place" gaskets 36 are shown around the back edge of housing 13 to seal cover 20. Another such gasket 37 is shown on the surface of charger housing 30 to seal opening 21 in back cover 20.

Figure 4:
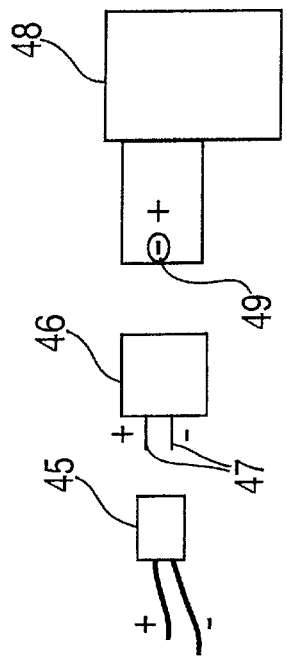
FIG. 4 is a cross section of the housing material of the radio as in FIG. 1.

The preferred housing material is a layer of ABS (acrylonitrile butadiene styrene) covered by a layer of polyurethane of approximately 50 durometers as a superbly impact resistant outer material. FIG. 4 shows this combination in cross section where 41 is the layer of ABS and 40 is the layer of polyurethane. Other combinations are also applicable as long as the rigid plastic is quite impact resistant and the outer covering is a resilient tough elastomer.

Figure 5:
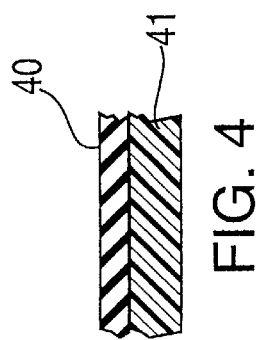
FIG. 5 is an exploded view of a power socket, adapter and modular battery of the radio as in FIG. 1.

Modern battery operated professional power tools use battery packs ranging from 9.6 to 18 volts. By selecting a 12 volt battery pack for the radio 1, an automotive AM/FM radio circuit board and display (augmented with a weather receiver) can be used with little modification. These come with powerful audio amplifier output stages and digital lighted displays. It is desirable to use a battery pack that is also used in other tools owned by the tradesman, or is at least the same brand. However, battery packs from different manufacturers, even of the same voltage ratings, have different contact configurations. For example, the Porter Cable 8500 battery pack is different from the DeWalt DW9071 even though both have similar ratings. For this purpose, FIG. 5 shows the arrangement using a standard socket 45 attached to the radio 1, with a replaceable adapter 46 which mates properly with both socket 45 at one end and a particular 12 volt battery pack 48 with its contacts 49. A variety of these adapters 46 are available for use.

Figure 6:
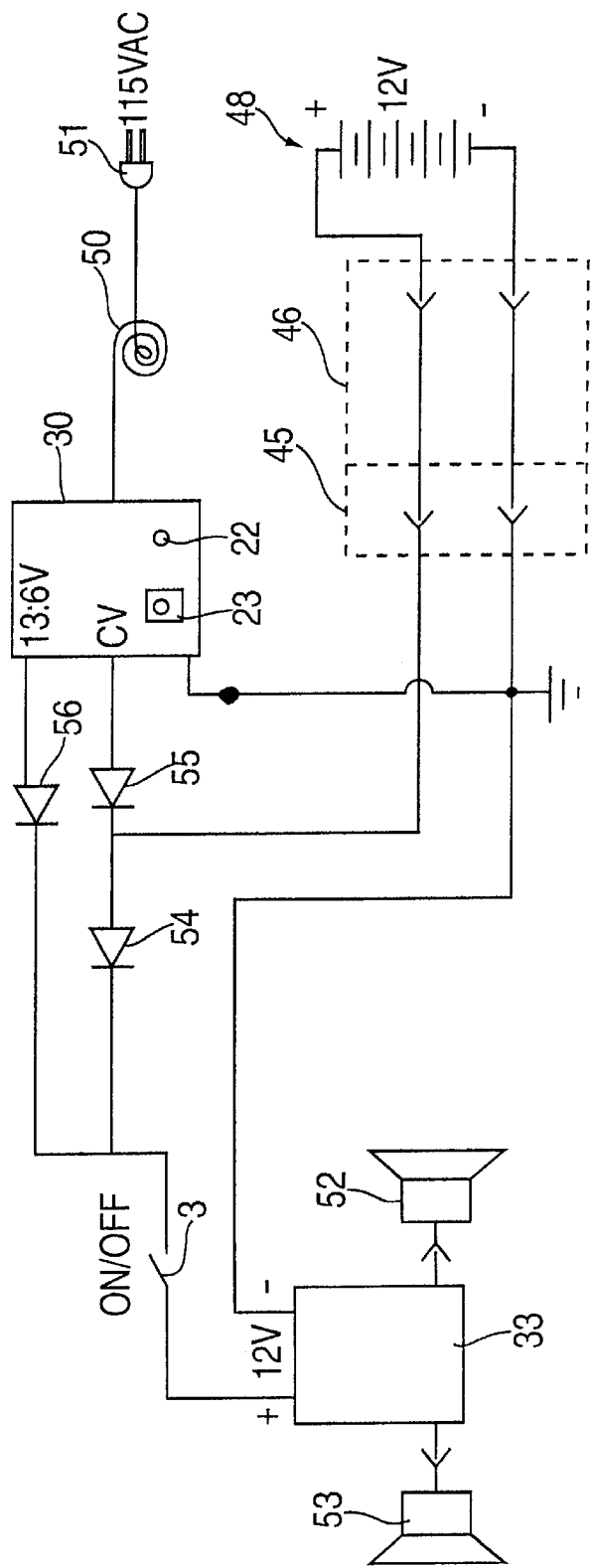
FIG. 6 is a schematic block diagram of the radio as in FIG. 1.
Figure 7:
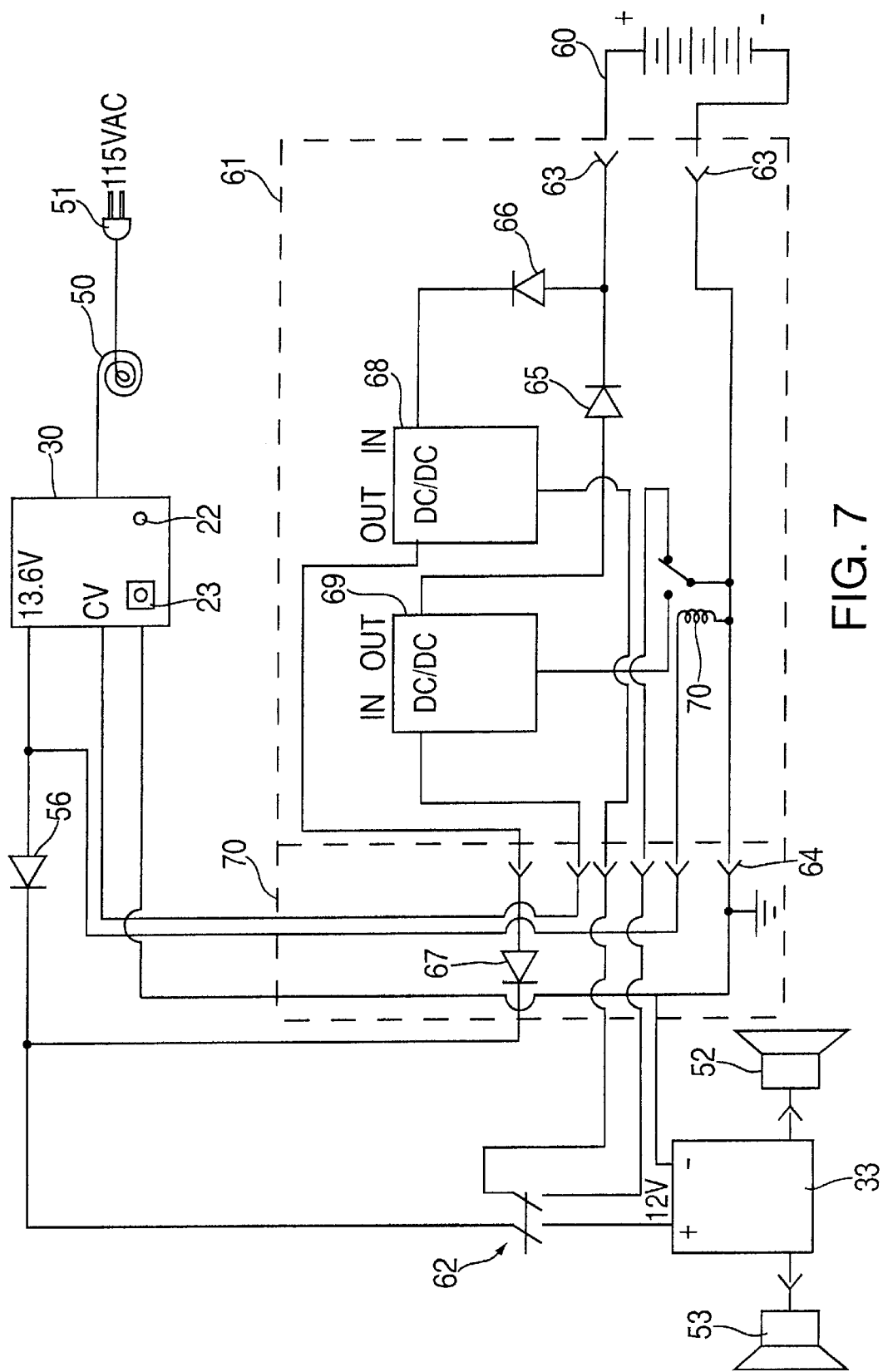
FIG. 7 is a schematic of an alternate embodiment of the radio of the present invention.

FIG. 6 shows a schematic block diagram of the electrical system. A combination power supply and battery charger 30 is supplied with 115 VAC via plug 51 and retractable cord 50. It supplies approximately 13.6 volts through silicon diode 56 to the radio electronics circuit board 33 through on/off switch 3. When button 23 is engaged, appropriate charge voltage is supplied to battery pack 48 through diode 55. Diode 54 feeds current from battery 48 to circuit 33 in the event that module 30 is not plugged into an outlet. The three diodes (54, 55 and 56) act as an automatic steering and isolation network to supply AC supplied current to operate radio 1, battery power to the radio 1, or to simultaneously power and charge the batteries from AC. In all cases, a nominal 12 volts (i.e. 12 to 13.2 volts), is supplied to radio circuit board 33, which powers loudspeakers 52 and 53.

In an alternate embodiment, additional circuitry is provided to permit the use of battery packs lower or higher than 12 volts to be used in radio 1. In this embodiment, socket 45 is replaced with socket 70 which now has six contacts mating with adapter 61, which match the requirements of a particular battery pack 60. The on/off switch is now upgraded to a double pole single throw variety for controlling output DC/DC converter 68 for battery operation of radio 1. This extra pair of contacts eliminate the "standby" losses of converter 68 when radio 1 is turned off.

Charging DC/DC converter 69 is selected via relay 70 when the charger is turned on. Although electromagnetic relay 70 is shown, a solid state relay can be used instead. If battery pack 60 has a voltage rating higher than 12 volts (e.g. 18 volts), the output converter 68 is a step down type reducing the battery voltage to a nominal 12 volts while charge converter 69 is a step up converting a nominal 12 volts from the charger to a nominal 18 volts at the battery. If the battery voltage were lower than 12 volts (e.g. 9.6 volts), the output converter 68 is a step up type while the charging converter 69 is a step down type. Diodes 56 and 67 are used for power steering while diodes 66 and 65 are used for DC/DC converter isolation.

To accommodate a variety of different battery packs and adapters, the battery compartment is generously oversize and lined with a soft polyurethane material to protect the battery pack from damage.

It is further known that other modifications may be made to the rugged tradesworker's radio of the present invention, without departing from the scope of the invention, as noted in the appended claims.

I claim:

1. A durable portable radio for tradesworkers comprising:
   an enclosure;
   a radio disposed in said enclosure and including a radio receiver for receiving radio signals and generating audio output signals responsive thereto;
   an AC powered DC charger for powering said radio and charging a removable DC voltage power source, said charger generating a first DC output voltage having a magnitude sufficient to power said radio;
   a removable DC power supply disposed in said enclosure for powering said radio and being charged by said charger, said DC power supply being selected to generate a second DC output voltage having a magnitude in a range that includes voltages both lower and higher than the magnitude of said first DC output voltage from said charger;
   a power conversion circuit disposed between said radio and said removable power supply, to enable said removable DC power supply to power said radio regardless of the magnitude of the second DC output voltage from said removable power supply.

2. A durable portable radio for tradesworkers comprising:
   an enclosure;
   a radio disposed in said enclosure and including a radio receiver for receiving radio signals and generating audio output signals responsive thereto;
   an AC powered DC charger for powering said radio and charging a removable DC voltage power source, said charger generating a first DC output voltage having a magnitude sufficient to power said radio;
   a removable DC power supply disposed in said enclosure for powering said radio and being charged by said charger, said DC power supply being selected to generate a second DC output voltage having a magnitude in a range that includes voltages both lower and higher than the magnitude of said first DC output voltage from said charger; and
   a power conversion circuit enabling said removable power supply to power said radio and be charged by said charger, regardless of the magnitude of the second DC output voltage from said removable power supply.

3. The durable portable radio of claim 2, wherein said power conversion circuit includes a first converter circuit for receiving said second DC output voltage from said removable power supply and generating a third DC output voltage having a magnitude that is sufficient to power said radio, and a second converter for receiving said first DC output voltage from said charger and generating a fourth DC output voltage that is suitable for charging said removable power supply.

4. The combination battery charger and durable portable radio for tradesworkers of claim 2, wherein said second DC output voltage of said removable power supply is selected to have a magnitude that is lower than said first DC output voltage from said charger, said first conversion circuit includes an up-converter for causing said third DC output voltage to be of higher magnitude than said second DC output voltage, and said second conversion circuit includes a down-converter for causing said fourth DC output voltage to be of lower magnitude than said first DC output voltage so that said fourth DC output voltage is of a magnitude that is suitable to charge said removable power supply.

5. The combination battery charger and durable portable radio for tradesworkers of claim 3, wherein said second DC output voltage of said removable power supply is selected to have a magnitude that is higher than said first DC output voltage from said charger, said first conversion circuit includes an down-converter for causing said third DC output voltage to be of lower magnitude than said second DC output voltage, and said second conversion circuit includes a up-converter for causing said fourth DC output voltage to be of higher magnitude than said first DC output voltage so that said fourth DC output voltage is of a magnitude that is suitable to charge said removable power supply.

6. The combination battery charger and durable portable radio for tradesworkers of claim 3, wherein said removable power supply comprise a portable power tool battery pack.

7. The combination battery charger and durable portable radio for tradesworkers of claim 6, wherein said portable power tool battery pack generates an output voltage of between 9.6 and 18 volts.

8. The combination battery charger and durable portable radio for tradesworkers of claim 7, wherein the magnitude of said first DC output voltage from said charger is greater than 9.6 volts and less than 18 volts.

9. A durable portable radio for tradesworkers comprising:
   a weather and impact resistant enclosure having an exterior surface and an interior space;
   radio receiver means for receiving radio signals and generating electronic audio output signals responsive thereto;
   said exterior surface having a plurality of surfaces,
   an antenna extending from one surface of said plurality of surfaces,
   a handle
   a ventilation opening extending from said interior space of said radio,
   a first power source including an electrical cord engageable with an electrical outlet,
   an adapter engageable with a removable secondary rechargeable direct current power source, said removable secondary rechargeable direct current power source engagable with a remote direct current powered hand tool, a charger to charge said secondary rechargeable direct current power source from said first power source, and wherein said weather and impact resistant enclosure comprises acrylonitrile butadiene styrene covered by a layer of polyurethane.

10. A durable portable radio for tradesworkers comprising:

a weather and impact resistant enclosure having an exterior surface and an interior space;

radio receiver means for receiving radio signals and generating electronic audio output signals responsive thereto;

said exterior surface having a plurality of surfaces, an antenna extending from one surface of said plurality of surfaces, a handle a ventilation opening extending from said interior space of said radio, a first power source including an electrical cord engageable with an electrical outlet, an adapter engageable with a removable secondary rechargeable direct current power source, said removable secondary rechargeable direct current power source engagable with a remote direct current powered hand tool, a charger to charge said secondary rechargeable direct current power source from said first power source, and wherein said second power source includes a battery pack having a voltage of between about 9.6 to about 18 volts.

11. The durable portable radio for tradesworkers as in claim 10 wherein said battery pack of said second power source has a voltage within the nominal operating range of said radio.

12. A durable portable radio for tradesworkers comprising:

a weather and impact resistant enclosure having an exterior surface and an interior space;

radio receiver means for receiving radio signals and generating electronic audio output signals responsive thereto;

said exterior surface having a plurality of surfaces, an antenna extending from one surface of said plurality of surfaces, a handle a ventilation opening extending from said interior space of said radio, a first power source including an electrical cord engageable with an electrical outlet, an adapter engageable with a removable secondary rechargeable direct current power source, said removable secondary rechargeable direct current power source engagable with a remote direct current powered hand tool, a charger to charge said secondary rechargeable direct current power source from said first power source, wherein said second power source further includes a combination power supply and battery charger supplied with 115 VAC, which supplies a voltage within the nominal operating range from said power supply to said radio receiver means, and further comprising a means to permit use of battery packs lower or higher than the nominal operating voltage to be used by said radio, said means comprising a socket having a plurality of contacts mating with an adapter matching predetermined requirements of a DC source power battery pack, and a double pole single throw on/off switch controlling a DC/DC power source converter for supplying power to said radio.

* * * * *